US007277114B2

(12) United States Patent
Konagaya (10) Patent No.: US 7,277,114 B2
(45) Date of Patent: Oct. 2, 2007

(54) IMAGE RECORDING APPARATUS AND METHOD

(75) Inventor: Tatsuya Konagaya, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 276 days.

(21) Appl. No.: 10/995,329

(22) Filed: Nov. 24, 2004

(65) Prior Publication Data

US 2005/0117012 A1    Jun. 2, 2005

(30) Foreign Application Priority Data

Nov. 27, 2003   (JP)   ............................. 2003-397964

(51) Int. Cl.
  *B41J 2/435*   (2006.01)
(52) U.S. Cl. ..................................... 347/262; 347/264
(58) Field of Classification Search ................ 271/9.01, 271/9.02, 9.05, 199, 226; 347/262, 264; 242/530.1, 541.5, 259–260
  See application file for complete search history.

(56) References Cited

U.S. PATENT DOCUMENTS

| | | | | |
|---|---|---|---|---|
| 5,187,531 A | * | 2/1993 | Ozawa et al. | ................. 355/72 |
| 5,896,187 A | | 4/1999 | Matsumoto et al. | |
| 6,268,029 B1 | * | 7/2001 | Akao | ........................ 428/35.2 |
| 6,575,546 B2 | * | 6/2003 | Matsumoto et al. | .......... 347/14 |
| 7,079,229 B2 | * | 7/2006 | Uejima | ........................ 356/61 |

FOREIGN PATENT DOCUMENTS

| | | |
|---|---|---|
| EP | 0 628 852 A1 | 12/1994 |
| EP | 0 595 940 B1 | 10/1995 |
| JP | 6-510374 A | 11/1994 |
| JP | 11-95330 A | 4/1999 |
| JP | 11095330 A * | 4/1999 |
| JP | 11-282088 A | 10/1999 |
| JP | 2001-56511 A | 2/2001 |
| JP | 2001056511 A * | 2/2001 |

* cited by examiner

*Primary Examiner*—Hai Pham
(74) *Attorney, Agent, or Firm*—Sughrue Mion, PLLC (57) ABSTRACT

A photographic printer is loaded with two webs of photographic paper, and produces photographic prints by exposure thereto. Initially, the photographic paper is advanced from two photographic paper rolls in parallel. Those two are combined together to constitute a photographic paper roll unit. The photographic paper is cut to obtain photographic paper sheets, on which an image frame is formed. In one embodiment, the photographic paper roll unit includes a single axial core which extends through axial holes of the two photographic paper rolls positioned at an interval L1, and is fitted thereon. The photographic paper rolls include a spliced region for splicing two consecutive photographic paper strips to one another. The spliced region is detected from a single one of the two photographic paper rolls in combination.

10 Claims, 11 Drawing Sheets

IMAGE RECORDING APPARATUS AND METHOD

BACKGROUND OF THE INVENTION

1. Field of the Invention

The present invention relates to an image recording apparatus and method. More particularly, the present invention relates to an image recording apparatus and method for use with a recording material which is unwound from a recording material roll for image forming.

2. Description Related to the Prior Art

A photographic printer such as a printer-processor composite machine is well-known in the art of image forming, and used for producing a photographic print by printing of an image frame on photographic paper as recording material. The image frame is obtained by photoelectric reading from developed photo film, to obtain image data in a digital form. Otherwise, a memory card or other storage medium is used to input image data of the image frame. In the printer, illuminating light is modulated by a light valve according to the input image data, to print an image on the photographic paper. Then the photographic paper is processed photographically and dried, to produce the photographic print. It is possible in the printer to raise image quality by image processing of the image data, for example correction of color balance and sharpness.

To raise a speed of processing in the photographic printer, plural images are preferably printed at the same time. For example, JP-B 3114718 (corresponding to JP-A 11-282088) discloses this idea. For example, two images are printed by exposure on the photographic paper with a large area simultaneously. Then the photographic paper is slitted along a line extending in the feeding direction. Also, a recording sheet or a photographic paper sheet for one frame is shifted in a web width direction crosswise to the feeding direction. Two photographic paper sheets are arranged in the web width direction for image recording by exposure at the same time. Then two photographic prints can be produced at one time.

However, the photographic paper is likely to be offset or skew in the web width direction. The photographic paper may be cut without removal of the tilted orientation. It is likely that margins of the photographic print are irregular, or that a recording region inside the margins is broken by cutting. The photographic paper sheet must be shifted in the web width direction at one time for every two frames. Sufficient time is required for the shifting, and is inconsistent to improvement of the processing speed.

JP-A 11-095330 discloses loading of plural roll magazines arranged in the web width direction, each of the roll magazines containing a photographic paper roll. Also, JP-A 2001-056511 and EP-B 595 940 (corresponding to JP-A 6-510374) disclose a collective type of roll magazine for containing a plurality of photographic paper rolls. The photographic printer unwinds the photographic paper from those at the same time for the image recording. These techniques have objects of raising efficiency in operation of the printer.

In image forming by use of a plurality of photographic paper rolls, an operator of the photographic printer must set those in the roll magazine. Loading of the photographic paper having photosensitivity requires operation in a dark room or in an environment shielded from ambient light. Difficulties in the operation are very high. According to manners of setting the photographic paper, it is likely that a first photographic paper roll is used up at the same time as existence of a remaining portion of the photographic paper in a second photographic paper roll. This requires operation of exchange because of using up of only one of the first and second photographic paper rolls. However, a problem arises in considerable time for a user to take for the exchange. Of course, both of the first and second rolls can be replaced by new rolls when only the first is used up. However, the second photographic paper roll must be abandoned. This causes wasteful use of the photographic paper.

According to JP-A 11-095330, a plurality of roll magazines in the photographic printer are arranged in the web width direction. Thus, the printer must have a considerably large size, to raise the manufacturing cost. Also, the thickness of panels of the roll magazines and a structural feature of a section for loading of the roll magazines constitute factors inconsistent to reducing an interval between the first and second photographic paper rolls arranged in the web width direction. It is conceivable to raise a length of an exposure region, or to add a sorting device. However, the cost and size for installing the printer cannot be low.

SUMMARY OF THE INVENTION

In view of the foregoing problems, an object of the present invention is to provide an image recording apparatus and method in which recording material can be used without waste, and in which loading of a recording material is easy.

In order to achieve the above and other objects and advantages of this invention, an image recording apparatus includes a recording material loading unit, loaded with a recording material roll unit, for advancing plural web-shaped recording materials along a feeding path, wherein the recording material roll unit includes plural recording material rolls, constituted by the plural recording materials, disposed adjacent to one another in a web width direction of the recording materials, and associated in a manner rotatable with one another. A cutter cuts the plural recording materials at one time to obtain plural recording sheets. An image recording unit records an image frame on the recording sheets and at one time in the web width direction.

Furthermore, a feeder transports the plural recording materials from the recording material roll unit on the feeding path being one, so as to move the plural recording materials past the cutter.

The plural recording materials are wound on a common axial core and positioned away from each other at a predetermined interval.

The recording material roll unit includes a single axial core for extending through axial holes of plural recording material rolls positioned away from each other at a predetermined interval, and for being fitted thereon.

The predetermined interval is equal to or less than 50 mm.

The recording material roll includes a spliced region for splicing two consecutive recording material strips to one another. Furthermore, one splice detector is positioned at a single one of the recording material rolls in the recording material roll unit, for detecting the spliced region.

The image recording unit records one common image frame to plural recording sheets which are arranged on one line in the web width direction among the plural recording sheets.

The recording material roll comprises N recording material rolls. The one common image frame is recorded commonly in the web width direction by the image recording unit, to produce N print sets constituted commonly by a group of plural prints.

Furthermore, a control unit determines whether a total number T of prints to be produced from image frames according to a first customer order is a multiple of N. If the total number T is not a multiple of N, then the image frames are sorted into a first group having N×A image frames and a second group having B image frame, where A and B satisfy a condition of T=N×A+B, A is an integer, and B is an integer smaller than N. The first group is subjected to printing in a combined manner per N image frames. The second group is subjected to printing in such a manner that an unused one of the recording sheets unused in printing for the second group is used for printing at least one of the image frames derived from the first group, and N recording sheets to be used at one time are provided with image frames from a single one of the first and succeeding customer orders.

The control unit further determines whether at least one specifically sized image frame is associated with the first customer order, the specifically sized image frame being designated for printing at a second printing size that is larger than the first printing size. In printing of the specifically sized image frame on sheet printing at the second printing size, at least one selected image frame derived from the first customer order is printed on a remaining unused one of the recording sheets of the second printing size having been unused for the specifically sized image frame, wherein the selected image frame is further printed on one of the recording sheets of the first printing size.

Furthermore, a control unit determines whether a total number T of prints to be produced from image frames according to a first customer order is a multiple of N. If the total number T is not a multiple of N, then the image frames are sorted into a first group having N×A image frames and a second group having B image frame, where A and B satisfy a condition of T=N×A+B, A is an integer, and B is an integer smaller than N. The first group is subjected to printing in a combined manner per N image frames. The second group is subjected to printing in such a manner that an unused one of the recording sheets unused in printing for the second group is used for printing at least one image frame derived from a succeeding customer order, and N recording sheets to be used at one time are provided with image frames from the first and succeeding customer orders by printing.

The control unit further determines whether at least one specifically sized image frame is associated with the first customer order, the specifically sized image frame being designated for printing at a second printing size that is larger than the first printing size. In printing of the specifically sized image frame on sheet printing at the second printing size, at least one selected image frame derived from the succeeding customer order is printed on a remaining unused one of the recording sheets of the second printing size having been unused for the specifically sized image frame.

The recording material loading unit further has at least one single roll magazine for containing one recording material roll. A magazine selector designates a selected one of the twin roll magazine and the single roll magazine, to cause advance of the web-shaped recording material in the selected one to the feeding path.

Furthermore, a control unit determines whether a total number T of prints to be produced from image frames according to a first customer order is a multiple of 2. If the total number T is not a multiple of 2, then the image frames are sorted into a first group having 2×A image frames and a second group having one image frame, where A and B satisfy a condition of T=2×A+1, and A is an integer. The first group is subjected to printing by selecting the twin roll magazine, and the second group is subjected to printing by selecting the single roll magazine.

The control unit further determines whether at least one specifically sized image frame is associated with the first customer order, the specifically sized image frame being designated for printing at a second printing size that is larger than the first printing size. The specifically sized image frame is printed by selecting the single roll magazine.

Furthermore, a control unit determines whether a print number of printing of image frames in one frame printing sequence is a multiple of a roll number of the recording material rolls constituting the recording material roll unit. If the print number is the multiple, prints which constitute a closing portion of the frame printing sequence are arranged in line in the web width direction among the recording sheets. If the print number is not the multiple, the control unit causes the image recording unit to record at least one of the image frames for two or more times in the frame printing sequence, and raises a print number of printing in the frame printing sequence to the multiple of the roll number.

In one preferred embodiment, furthermore, a control unit determines whether at least two image frames to be recorded at different sizes are included in one frame printing sequence, and if the at least two image frames are included therein, causes the image recording unit to record at least one of the image frames for two or more times.

In another preferred embodiment, furthermore, a control unit determines whether a print number of printing of image frames in one frame printing sequence is a multiple of a roll number of the recording material rolls constituting the recording material roll unit. If the print number is the multiple, prints which constitute a closing portion of the frame printing sequence are arranged in line in the web width direction among the recording sheets. If the print number is not the multiple, the control unit reduces a print number of printing in the frame printing sequence to a multiple of the roll number, and causes the image recording unit in a succeeding frame printing sequence to record an image frame of a smaller number at a closing portion of the frame printing sequence, the smaller number being short of the roll number.

In still another preferred embodiment, furthermore, a control unit determines whether at least two image frames to be recorded at different sizes are included in one frame printing sequence, and if the at least two image frames are included therein, causes the image recording unit to record at least one of the image frames in recording of a succeeding frame printing sequence.

The recording material roll unit further includes a spliced sheet portion for securing material leading ends of the plural recording materials which are positioned away from each other at the predetermined interval.

The recording material loading unit is loaded with a twin roll magazine for containing the recording material roll unit. The twin roll magazine includes a pair of axial sleeves formed with magazine end panels opposed to each other. A roll holder is further secured to the recording material roll unit at the axial core, and has two ends supported by respectively the axial sleeves in a rotatable manner.

The recording material roll unit is packaged inside a light-tight packaging sheet before being set in the recording material loading unit. The spliced sheet portion is disposed at an end of the light-tight packaging sheet, and is made to remain on the material leading ends upon removal of the light-tight packaging sheet from the recording material roll unit.

The twin roll magazine includes a passage opening for passage of the recording material through. A supply roller is disposed in the passage opening, for being rotated to transport the recording material to the feeding path.

The recording material roll unit further includes a spacer, having a predetermined thickness, and inserted between the plural recording material rolls.

The recording material loading unit is loaded with a twin roll magazine for containing the recording material roll unit. The recording material loading unit is further loaded with a single roll magazine for containing a single recording material roll of a single recording material. Furthermore, there is a magazine selector or roll selector for changeover of the recording material roll unit and the single recording material roll between the twin roll magazine and the single roll magazine, to transport the plural recording materials and the single recording material selectively to the feeding path.

Furthermore, a control unit determines whether a print number of printing of image frames in one frame printing sequence is a multiple of a roll number of the recording material rolls constituting the recording material roll unit. If the print number is the multiple, prints which constitute a closing portion of the frame printing sequence are arranged in line in the web width direction among the recording sheets. If the print number is not the multiple, the control unit reduces a print number of printing in the frame printing sequence to a multiple of the roll number, and causes the image recording unit and the roll selector to record an image frame of a smaller number at a closing portion of the frame printing sequence by use of the single recording material roll, the smaller number being short of the roll number.

In one preferred embodiment, furthermore, a control unit determines whether at least two image frames to be recorded at different sizes are included in one frame printing sequence, and if the at least two image frames are included therein, causes the image recording unit and the roll selector to record at least one of the image frames by use of the single recording material roll.

The single recording material roll has a web width equal to a web width of the recording material rolls.

In another preferred embodiment, The recording material loading unit is loaded with plural single roll magazines arranged in the web width direction, for containing single recording material rolls having web widths different from one another.

Furthermore, a shifting mechanism shifts the single recording material from the single roll magazine in the web width direction, to set a centerline thereof at a center of the image recording unit with respect to the web width direction.

Furthermore, a guiding mechanism is disposed in the recording material loading unit on the feeding path, for regulating movement of the recording material in the web width direction in advance from the recording material roll unit.

In still another preferred embodiment, the twin roll magazine is wrapped in a light-tight bag before being set in the recording material loading unit.

The light-tight bag includes a bag body for containing the twin roll magazine with looseness. Two tubular paths are formed through the bag body, for allowing external access to the twin roll magazine, for handling of the recording materials shielded from ambient light.

Recording characteristics of the plural recording materials are equal to one another.

The image recording unit includes one calibration device for calibration related to recording material of a single one of the recording material rolls included in the recording material roll unit.

Lengths of the plural recording materials are equal to one another.

Web widths of the plural recording material rolls are equal to one another.

In one aspect of the invention, an image recording method is provided, in which plural recording materials in a web form are advanced from plural recording material rolls in one feeding direction, wherein the plural recording material rolls are arranged in a web width direction to constitute a recording material roll unit. The plural recording materials are cut to obtain recording sheets. An image frame is formed on the recording sheets.

Accordingly, the recording material can be used without waste, and loading of a recording material is easy, because of the use of the recording material roll unit including two or more recording material rolls.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
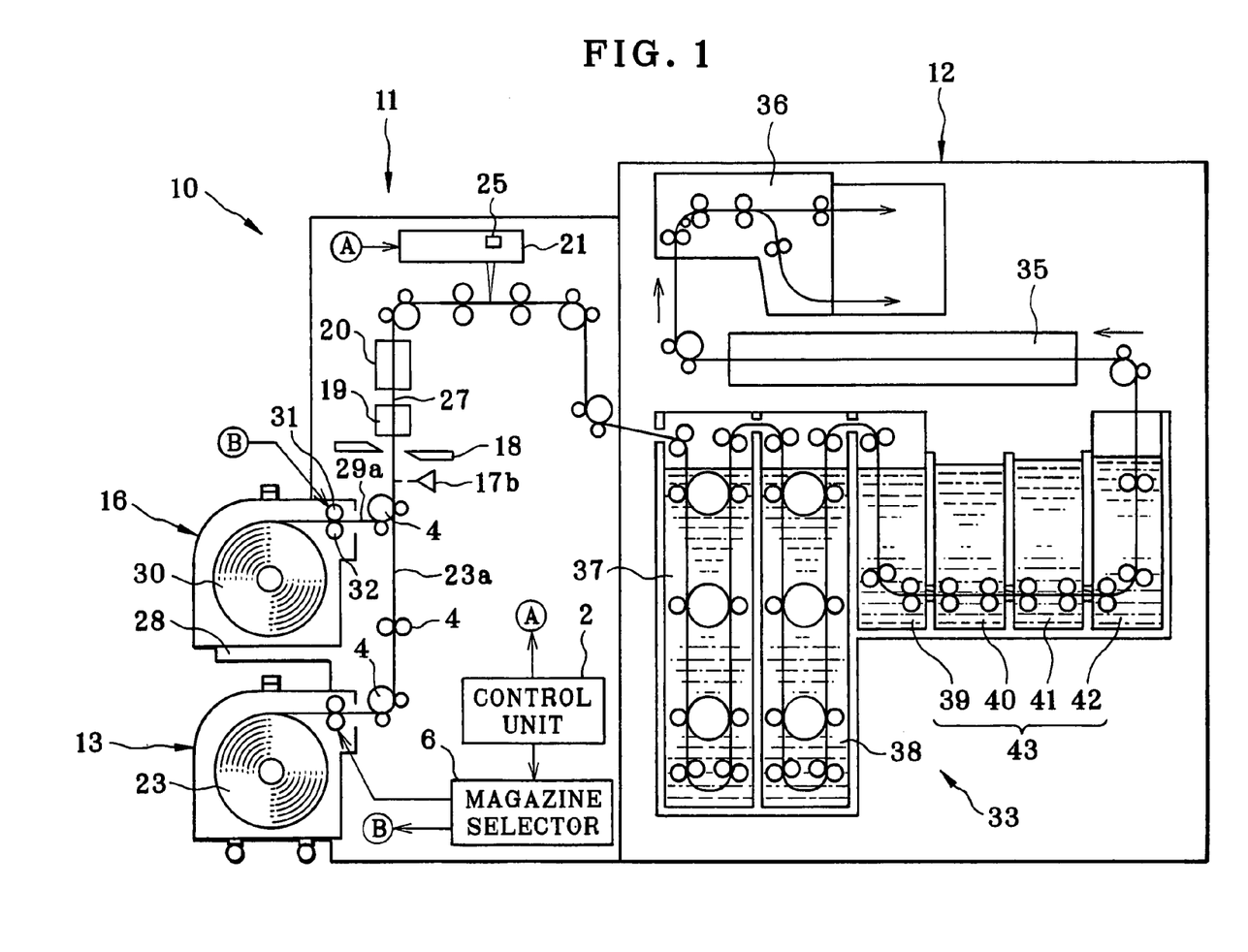
FIG. 1 is an explanatory view illustrating a printer-processor composite machine.

In FIG. 1, an image recording apparatus of the invention is illustrated. A printer-processor composite machine 10 is constituted by a photographic printer 11 as a recording material loading unit, and a paper processor 12. The printer 11 is loaded with one twin roll magazine 13, and two single roll magazines 15 and 16, and includes splice detectors 17a and 17b having photo sensors, a cutter 18, a back imprinting mechanism 19, a shifting mechanism 20, and an image forming exposure printhead 21.

Photographic paper rolls 22 and 23 are set in the twin roll magazine 13 in a state arranged in their axial direction. See FIG. 2. Those are recording material rolls formed by winding respectively photographic paper 22a and 23a having photosensitivity. When two supply rollers in the twin roll magazine 13 rotate, the photographic paper 22a and 23a is unwound from the photographic paper rolls 22 and 23, and advanced toward the photographic printer 11. The photographic paper 22a and 23a is cut by the cutter 18, to obtain a photographic paper sheet 27 as a recording sheet with a predetermined length.

Note that a magazine selector or roll selector 6 is connected for changeover to set a selected one of the twin roll magazine 13 and the single roll magazines 15 and 16.

A stage or paper loading tray 28 as a recording material loading unit is included in the photographic printer 11, and located with the single roll magazines 15 and 16 arranged in the axial direction or web width direction. Photographic paper rolls 29 and 30 as recording material rolls are set in the single roll magazines 15 and 16. The photographic paper roll 30 is a roll of photographic paper 29a as a recording material having a web width different from that of the photographic paper 29a of the photographic paper roll 29. Specifically, the photographic paper roll 30 has a smaller web width. As supply rollers 31 and 32 in the single roll magazine 15 or 16 are rotated, the photographic paper 29a is drawn out toward the printer 11, and cut by the cutter 18 to obtain the photographic paper sheet 27.

The photographic paper sheet 27 transported past the cutter 18 is caused by feed rollers 4 as feeder to move to the back imprinting mechanism 19. The back imprinting mechanism 19 imprints required information to a back surface of the photographic paper sheet 27, the information including a frame number, correction data and the like. The shifting mechanism 20 includes shifting rollers movable in the web width direction of the photographic paper sheet 27. The shifting mechanism 20 shifts the photographic paper sheet 27 from the single roll magazines 15 and 16 for the purpose of the position adjustment. There is a well-known laser printer (not shown) incorporated in the image forming exposure printhead 21. In other words, the printhead 21 is constituted by a light source and a light valve, operates in relation to three primary colors, and prints an image by a sequence for full-color recording. The printhead 21 produces exposing light according to image data stored in an internal image memory, or image data transmitted from an image reader (not shown), to take an exposure on the photographic paper sheet 27 to record an image in a latent image form.

The photographic paper sheet 27 after the image printing is transported to the paper processor 12. The paper processor 12 includes a processing bath group 33, a paper sheet drier 35, and a paper sheet dispenser 36. The processing bath group 33 includes a developing bath 37, a bleach/fixing bath 38, and plural rinsing baths 43 in the direction of the transport. The rinsing baths 43 have a first rinsing bath 39, a second rinsing bath 40, a third rinsing bath 41, and a fourth rinsing bath 42. The developing bath 37 is loaded with developing solution. The bleach/fixing bath 38 is loaded with bleach/fixing solution. Each of the rinsing baths 39-42 is loaded with rinsing water. The photographic paper sheet 27 is developed, bleached, fixed, and rinsed in the transport through the developing bath 37, the bleach/fixing bath 38 and the rinsing baths 39-42 while transport racks are driven for traveling the photographic paper sheet 27.

The paper sheet drier 35 is disposed above the liquid baths 37-42, and is constituted by a gas supply duct and a conveyor belt. The duct blows dry gas toward the conveyor belt in a heated state by a heater, to press the photographic paper sheet 27 toward the conveyor belt. As the photographic paper sheet 27 is moved past the duct, rinsing water is removed from the photographic paper sheet 27. Then the photographic paper sheet 27 from the paper sheet drier 35 is transferred toward the paper sheet dispenser 36. The paper sheet dispenser 36 sorts a plurality of photographic paper sheets 27 according to printing sizes, frame printing sequences and the like, so the photographic paper sheet 27 is dispensed to a receptacle tray (not shown).

Figure 2:
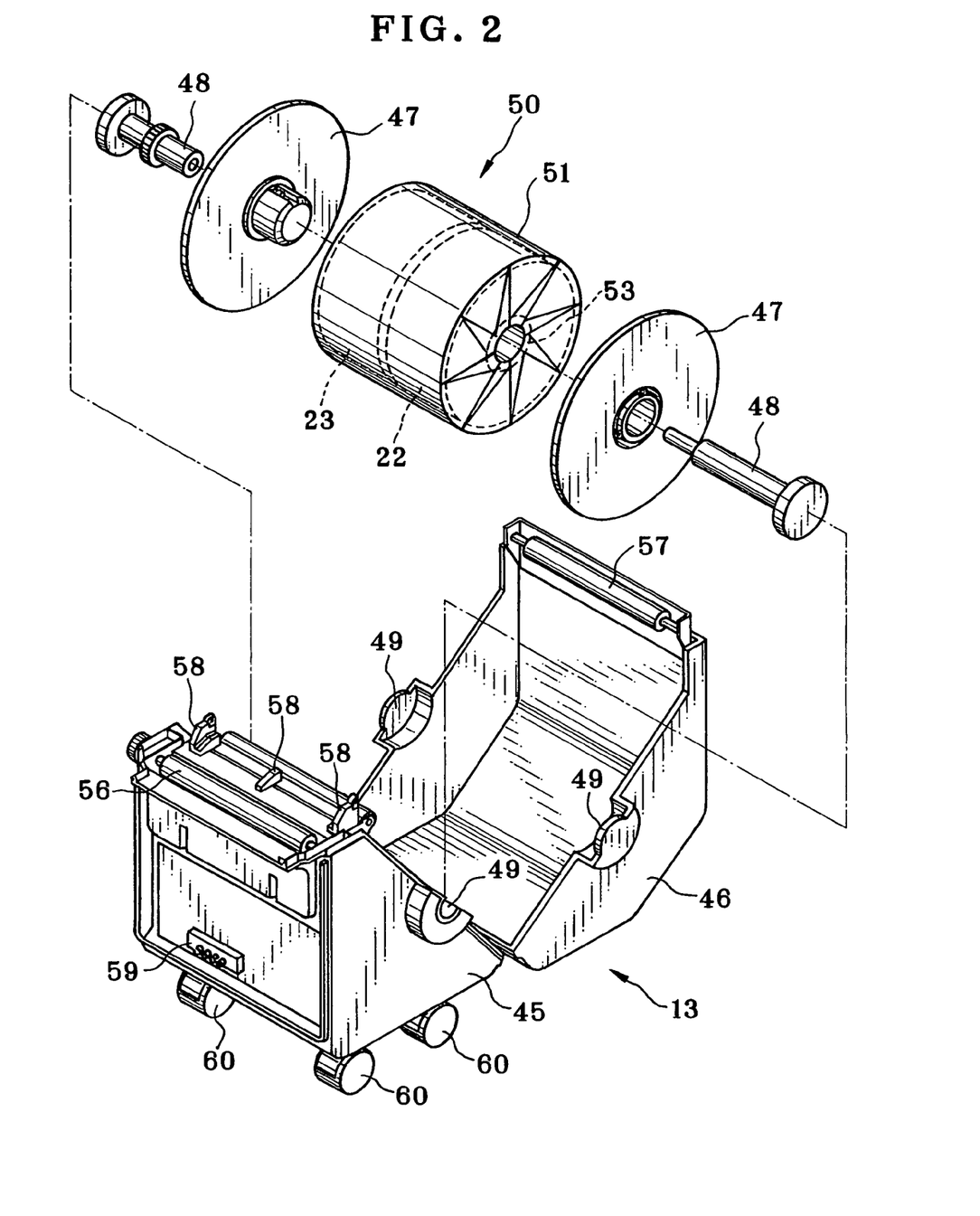
FIG. 2 is a perspective view illustrating a structure of a twin roll magazine.

In FIG. 2, the twin roll magazine 13 to contain each of the photographic paper rolls 22 and 23 is constituted by a magazine body 45 and a magazine lid 46 for openably closing the magazine body 45. Roll holder rods 48 support the photographic paper roll 22 or 23. A pair of holder flange disks 47 contact an end face of the photographic paper roll 22 or 23 disposed between those. Axial sleeves 49 are formed on lateral panels of the twin roll magazine 13, and positioned on junctures where the magazine body 45 and the magazine lid 46 are combined. Axial ends of the roll holder rods 48 are received pivotally by the axial sleeves 49, to support the photographic paper rolls 22 and 23 inside the twin roll magazine 13 in a rotatable manner.

Figure 3:
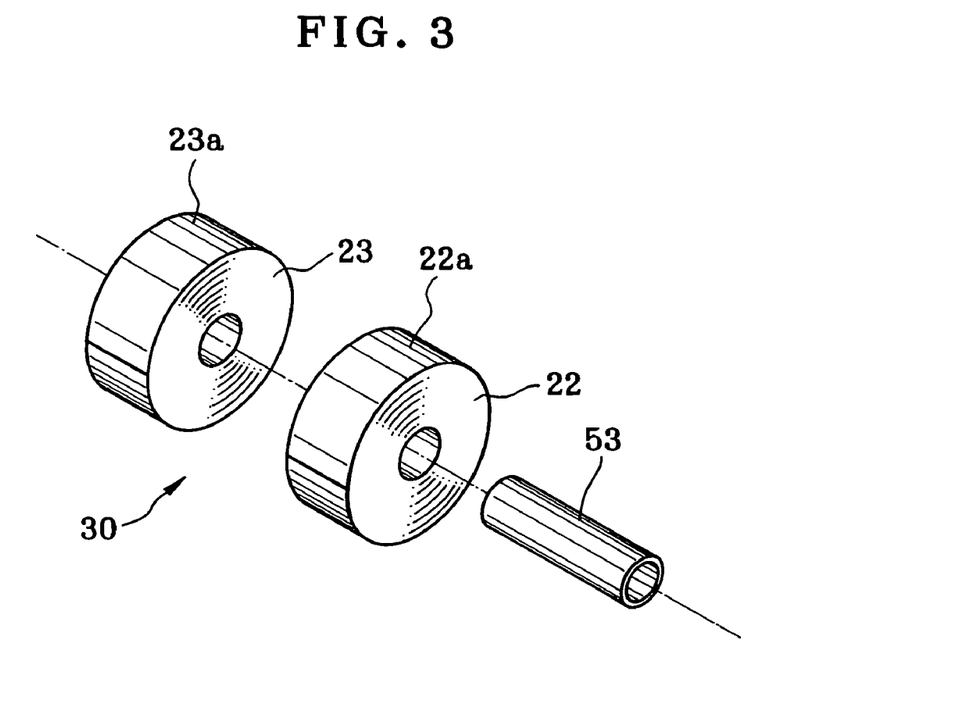
FIG. 3 is a perspective view illustrating a photographic paper roll unit.
Figure 4:
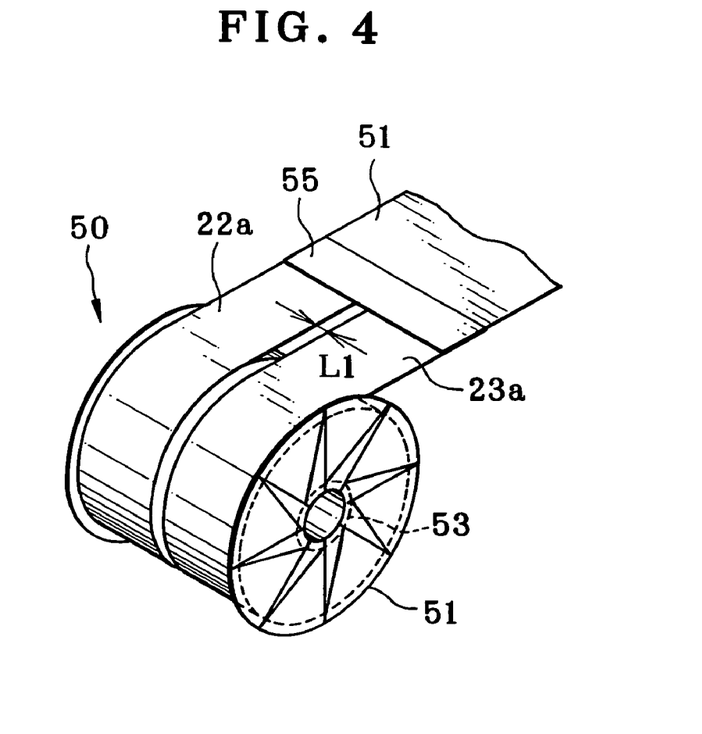
FIG. 4 is a perspective view illustrating a state of drawing of photographic paper from a photographic paper roll unit.

A term of photographic paper roll unit 50 as a recording material roll unit is used to designate a coaxially combined set of the photographic paper rolls 22 and 23. A light-tight packaging sheet 51 wraps the photographic paper roll unit 50. This is initially set in the twin roll magazine 13 in the wrapped state with the light-tight packaging sheet 51. In FIG. 3, the photographic paper roll unit 50 includes an axial core 53 for axially supporting the photographic paper rolls 22 and 23 of the photographic paper 22a and 23a. When the axial core 53 rotates, those two rotate together. In FIG. 4, the photographic paper 22a and 23a is unwound from the roll periphery. Note that a spliced sheet portion 55 is defined where the leading ends of the photographic paper 22a and 23a are connected with a middle portion of the light-tight packaging sheet 51 covering the photographic paper rolls 22 and 23. In the initial advance of the photographic paper 22a and 23a, the middle portion of the light-tight packaging sheet 51 covering the periphery of the photographic paper roll 22 or 23 is split from its portions covering the roll end faces, and is advanced together with the photographic paper 22a or 23a. The photographic paper rolls 22 and 23 in the photographic paper roll unit 50 have the same photographic characteristics related to the recording. This means that the color balance value and average density difference of the photographic paper 22a and 23a are equal to or less than 0.05 when gray patch is recorded with density of colors of 0.75-0.85 with reference to the photographic paper 22a and 23a. Of course, the same characteristics between the two are obtained if the photographic paper rolls 22 and 23 are produced from the same producing lot in the factory, or produced from one large-area web.

In the twin roll magazine 13, a capstan roller 56 as a supply roller is rotatable on the magazine body 45. A nip roller 57 as a supply roller is rotatable on the magazine lid 46. When the magazine lid 46 is closed, the nip roller 57 is opposed to the capstan roller 56. A motor (not shown) drives the capstan roller 56 to rotate, so the photographic paper 22a and 23a is nipped and fed in cooperation with the nip roller 57. Three guiding mechanisms 58 at a passage opening are arranged at a space equal to the web width of the photographic paper 22a and 23a, and guide the photographic paper 22a and 23a in a state kept from moving in a zigzag.

An identification storage medium 59, such as an ID chip, is secured to a front face of the magazine body 45 in a removable manner. The identification storage medium 59 stores information of a paper type, web width, web length, suitable processing solution, emulsion producing lot number, expiring data, and the like. The identification storage medium 59 is accessed and read upon setting the twin roll magazine 13 in the photographic printer 11. Note that the information may be recorded in the identification storage medium 59 in a photoelectrically readable form. Also, the identification storage medium 59 may be an RFID (radio frequency identification) tag. As the photographic paper rolls 22 and 23 have the same characteristics, only one identification storage medium 59 is sufficient, which is consistent to reduction of cost. Also, four rotatable casters 60 are secured to a lower face of the magazine body 45, and facilitate setting of the twin roll magazine 13 into the printer 11 without manually raising the magazine body 45 from a floor or other base surface.

Figure 5:
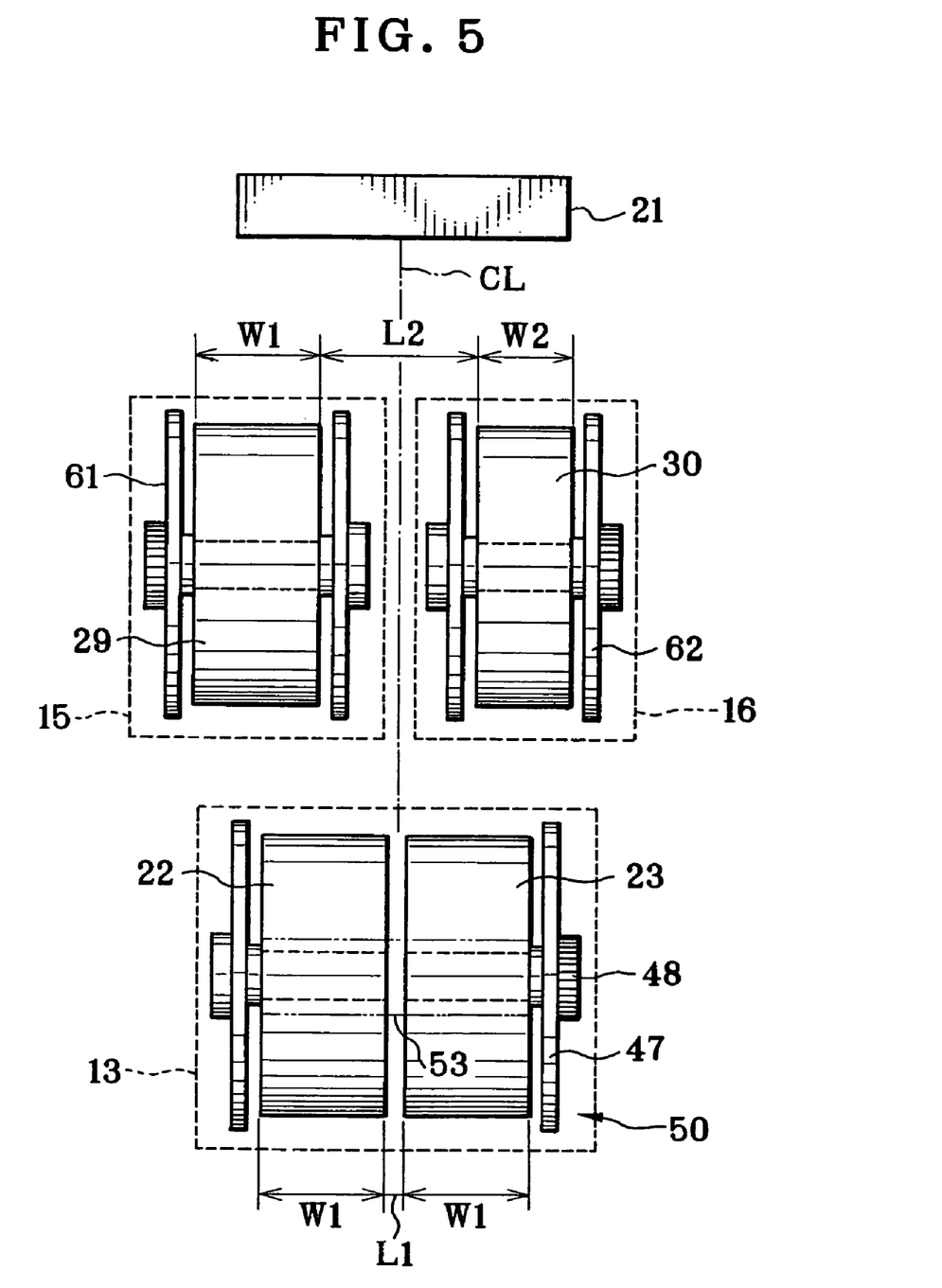
FIG. 5 is an explanatory view illustrating a relationship in the position between photographic paper rolls in the twin roll magazine and two single photographic paper rolls.

The single roll magazines 15 and 16 are positioned higher than the twin roll magazine 13, and contain the photographic paper rolls 29 and 30 which are different in the web width. In FIG. 5, roll holders 61 and 62 support respectively the photographic paper rolls 29 and 30 being set in the single roll magazines 15 and 16. Each of the roll holders 61 and 62 includes a support shaft and flanges. In the embodiment, the single roll magazine 15 contains the photographic paper roll 29 of which the web width W1 is equal to the web width of the photographic paper rolls 22 and 23 set in the twin roll magazine 13. For example, the web width W1 is the king-size width KG=152 mm. Also, a web width W2 of the photographic paper roll 30 set in the single roll magazine 16 is the panoramic size width, and is smaller than W1.

In FIG. 5, the photographic paper rolls 22 and 23 in the photographic paper roll unit 50 are inserted in the photographic printer 11 in positions symmetrical to one another with respect to the centerline CL of an exposed region of the image forming exposure printhead 21. Opposed end faces of the photographic paper rolls 22 and 23 opposed to one another are located with an interval L1 between those, wherein the interval L1 is equal to or less than 50 mm. A specially preferable range of the interval L1 is 5-20 mm in consideration or offsetting of the position of the photographic paper sheet 27 in the web width direction during the transport. Thus, the interval between the rolls can be reduced by the size of the magazine panel or holder portions with reference to the interval L2 obtained if the single roll magazines 15 and 16 are directly arranged.

It is to be noted that the interval L1 between the photographic paper rolls 22 and 23 is determined depending upon their positions on the axial core 53. Positions of attachment of the photographic paper 22a and 23a to the spliced sheet portion 55 depend on the positions of the photographic paper rolls 22 and 23 on the axial core 53.

For the production of the photographic paper roll unit 50, it is preferable that the trailing ends of the photographic paper 22a and 23a are first attached to the unused axial core 53, before the axial core 53 is caused to rotate, finally to form the two photographic paper rolls 22 and 23 originally in combination.

The operation of the embodiment is described. To exchange the photographic paper roll unit 50, an operator removes the twin roll magazine 13 from the printer-processor composite machine 10, and sets one unused photographic paper roll unit 50. The twin roll magazine 13 can be easily moved manually by use of the casters 60. So the time for the operator to move the twin roll magazine 13 can be shortened.

An operator or user opens the magazine lid 46 of the twin roll magazine 13, to set the photographic paper roll unit 50 into the twin roll magazine 13 with the roll holder rods 48. Then he or she closes the magazine lid 46. After this, the printer-processor composite machine 10 is loaded with the twin roll magazine 13, to finish the exchange of the photographic paper roll unit 50. Because of entire covering with the light-tight packaging sheet 51, those steps can be carried out in an illuminated room without use of the darkroom. Also, the photographic paper rolls 22 and 23 are exchanged at one time of operation, time required for working of the operator can be reduced.

After the photographic paper roll unit 50 is loaded, the set of the supply rollers rotates, to advance the leading ends of the photographic paper 22a and 23a into the photographic printer 11 together with the light-tight packaging sheet 51. The leading ends are cut away together with the light-tight packaging sheet 51, because unsuitable for image printing. When the photographic paper roll unit 50 is set, the information stored in the identification storage medium 59 is read by a control unit 2 in the printer 11, so as to set up the conditions for the exposure. As the photographic paper rolls 22 and 23 in combination are equal in the photographic characteristics, the conditions for the exposures can be equal for those.

Note that, if operation of calibration of the image forming exposure printhead 21 is desired, only either one of the photographic paper 22a and 23a can be used in the calibration, because of the same photographic characteristics. This is effective in efficiency in the calibrating operation of a calibration device 25 in the printhead 21, as one result of the calibration can be used for the two of the photographic paper 22a and 23a.

Figure 6:
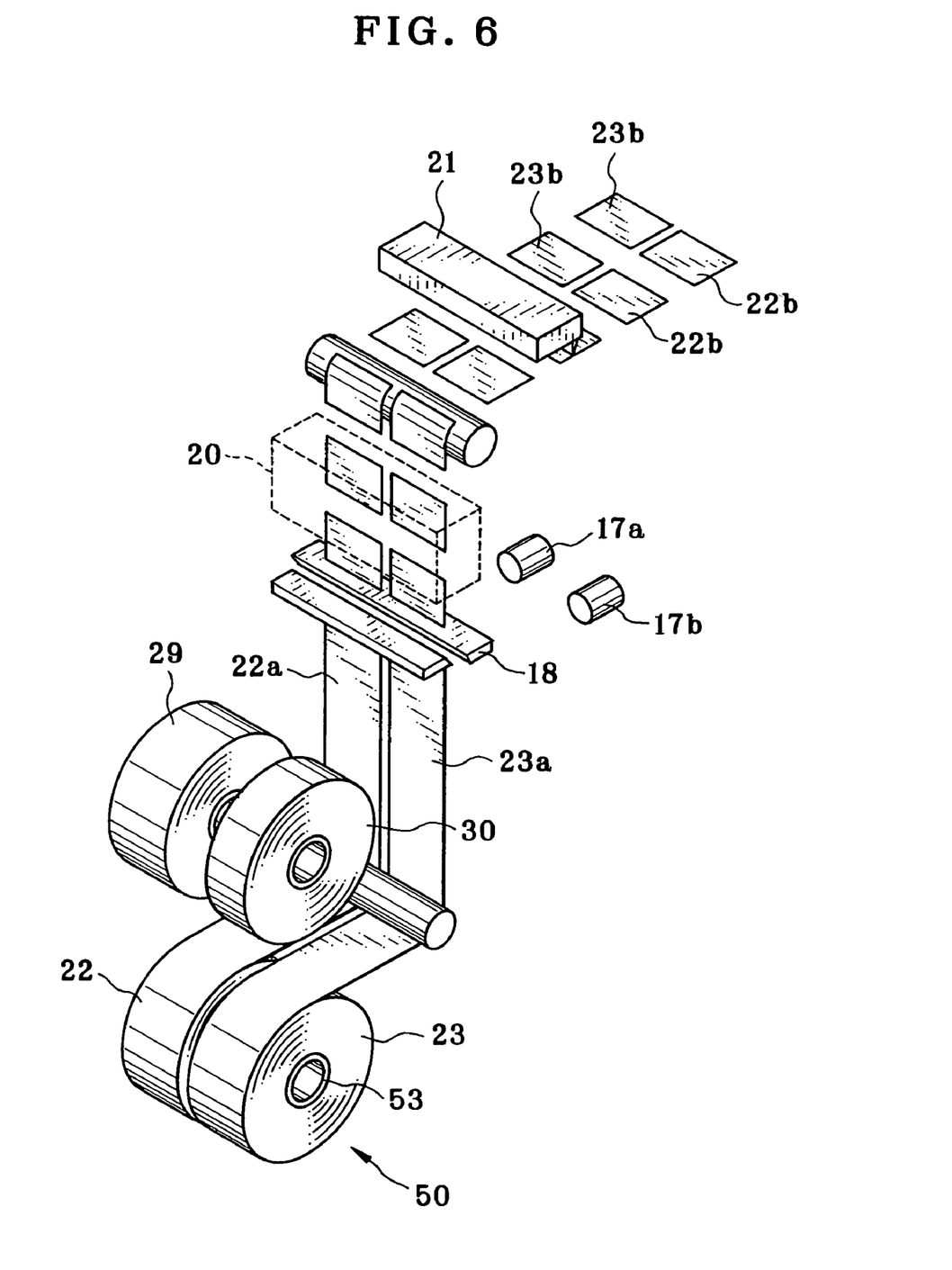
FIG. 6 is a perspective view illustrating printing to photographic paper sheets advanced from the photographic paper roll unit.

Referring to FIG. 6, the photographic paper 22a and 23a from the photographic paper rolls 22 and 23 is cut by the cutter 18, so photographic paper sheets 22b and 23b as a recording sheet, image frame, and print are obtained at a predetermined length which is 102 mm as a size of the king-size print. The photographic paper sheets 22b and 23b are further advanced. The image forming exposure printhead 21 is driven to print image frames simultaneously to the photographic paper sheets 22b and 23b by exposure. As the two image frames are printed at the same time, the speed of printing in the photographic printer 11 can be remarkably high. Furthermore, the producing lot in the factory from which the photographic paper rolls 22 and 23 have been obtained is the same. Thus, the length of the photographic paper 22a and 23a is equal. It is possible to use up the photographic paper rolls 22 and 23 at the same time. Wasteful use of the material can be avoided. Time required by an operator for exchange of the photographic paper rolls 22 and 23 can be reduced.

The photographic paper sheets 22b and 23b are transported in parallel with one another. This is advantageous also for double printing, in which each image frame is printed for two prints. Note that the photographic paper sheets 22b and 23b are not sorted in a single collected state but in two independent bundles at the time of dispensation of the prints in the paper sheet dispenser 36. Finally, the two bundles or sets of prints are discharged in a manner individual from one another.

Figure 7:
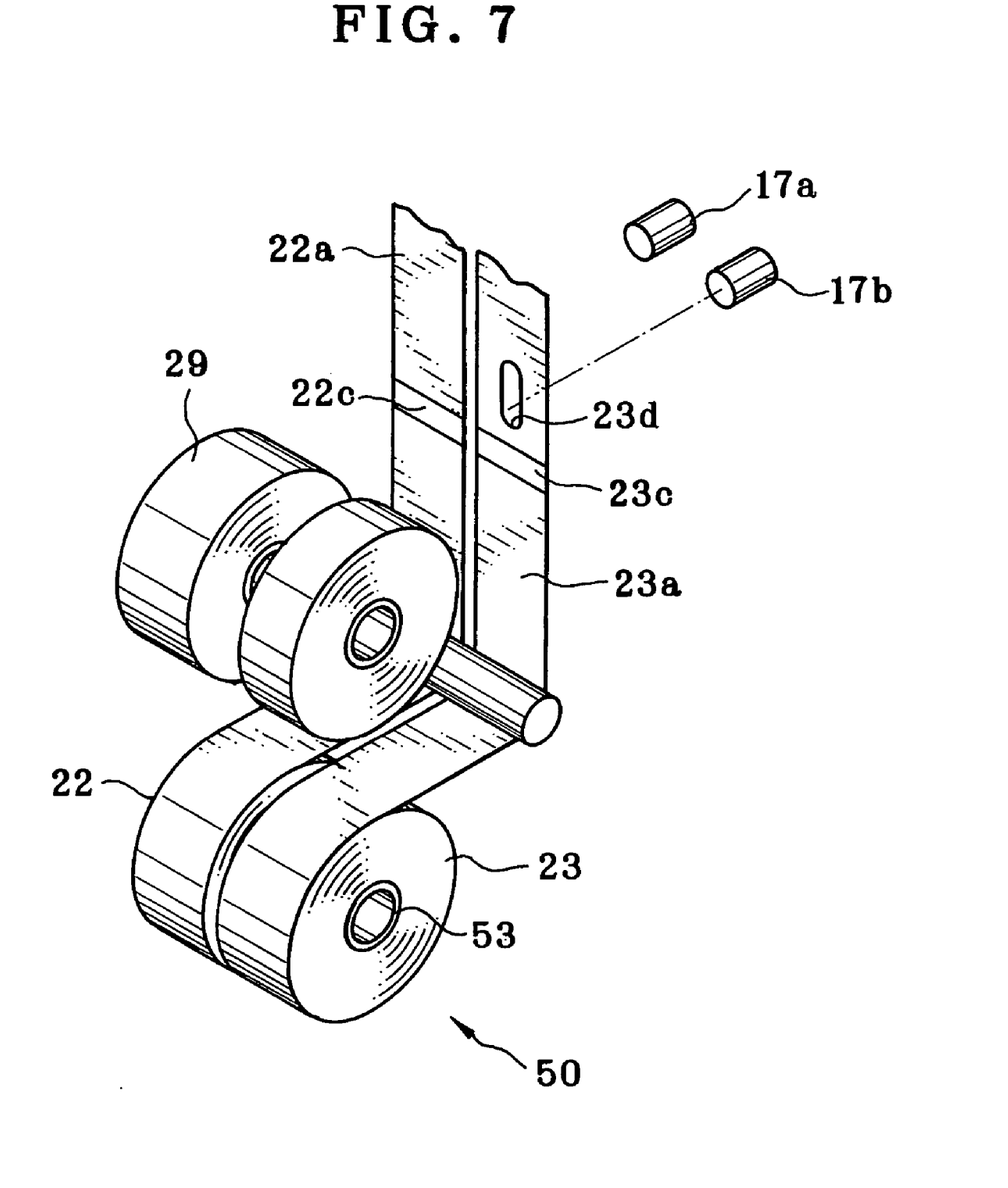
FIG. 7 is a perspective view illustrating detection of a spliced region of the photographic paper.

In FIG. 7, it is likely that spliced regions 22c and 23c are included in the photographic paper rolls 22 and 23 for connection between paper strips in the photographic paper 22a and 23a. As has been described above, the photographic paper rolls 22 and 23 for the photographic paper roll unit 50 are obtained from the same producing lot in the factory. Accordingly, the spliced regions 22c and 23c are created at the same time, and appear simultaneously as a result. A splice indicating hole 23d in the photographic paper 23a is detected by operation of only the splice detector 17b on one side, to detect the spliced regions 22c and 23c. This makes it possible to use only the splice indicating hole 23d without forming one more hole in the photographic paper 22a. Also, the printer-processor composite machine 10 may be a type only loadable with the twin roll magazine 13 without the single roll magazine. The splice detector 17b is used without need of the splice detector 17a. This is effective in reducing the manufacturing cost of the printer-processor composite machine 10.

Figure 8:
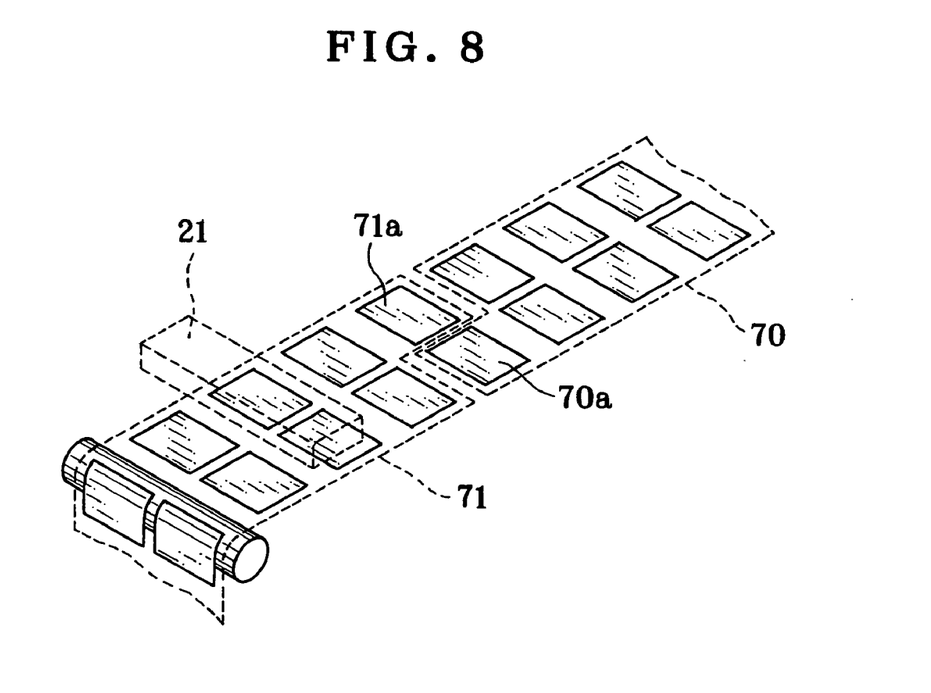
FIG. 8 is a perspective view illustrating one preferred embodiment in which printing for two frame printing sequences is effected together.
Figure 9:
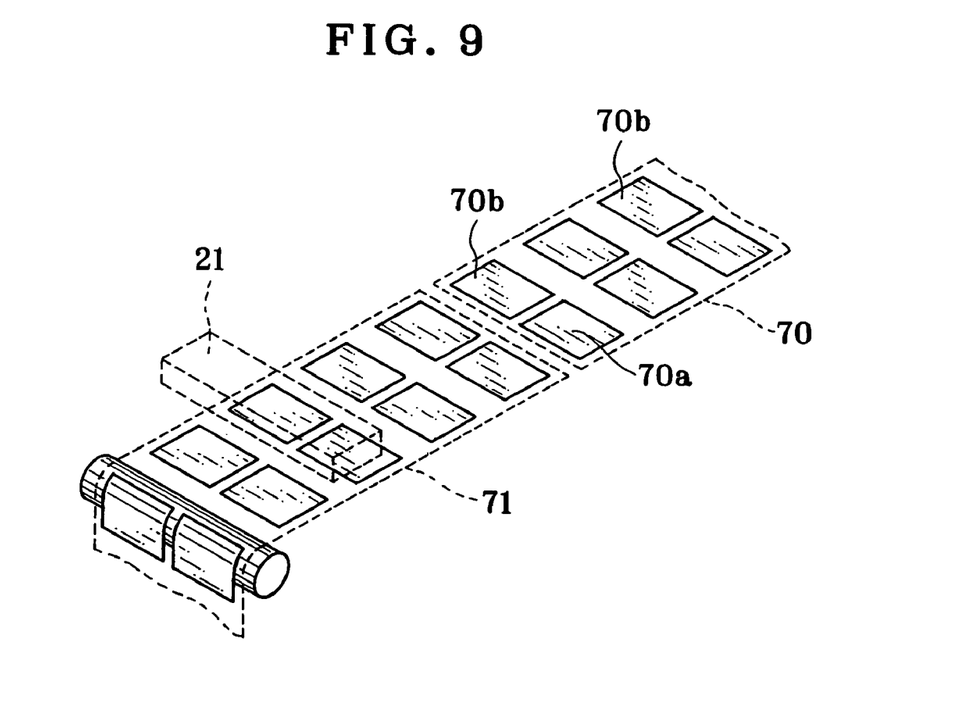
FIG. 9 is a perspective view illustrating one preferred embodiment in which the print number of prints is readjusted as an even number.

In the embodiment, the total number of the photographic paper sheets 22b and 23b is an even number because of the two photographic paper rolls 22 and 23 in the photographic paper roll unit 50. However, it is likely that a total of image frames in each one frame printing sequence is an odd number. In FIG. 8, printing for this purpose is illustrated. One final image included in a first frame printing sequence or printing job 70 is printed at the same time as a first image frame included in a second frame printing sequence or printing job 71 by use of two adjacent photographic paper sheets 70a and 71a as a recording sheet, image frame, and print. Accordingly, the photographic paper sheets can be used fully without waste. Furthermore, a method of FIG. 9 can be used. One of the images included in the first frame printing sequence 70 is printed at the same time as the final image frame by use of the photographic paper sheet 70a and a photographic paper sheet 70b adjacent thereto, so as to produce two photographic prints with the same image. Those two image frames can be printed consecutively one after another. Otherwise, the two image frames may be printed at the same time as the final image frame. See FIG. 9. The two image frames may be selected by a customer, but also can be determined automatically at random.

Note that the frame printing sequence or printing job as a term used herein means that a set of consecutive image frames and print numbers of those per one customer order for printing. However, one frame printing sequence may be a set associated with only part of consecutive image frames associated with one customer order, and also may be a set associated with a combination of plural series of consecutive image frames associated with plural customer orders, typically if each series includes a small number of image frames.

Also, other methods may be used for printing final remaining frames at the end. Image data for the remaining frames may be stored for plural frame printing sequences. Upon lapse of time of a predetermined length, or at the end of plural frame printing sequences, it is possible to produce prints of the remaining frames at one time.

Figure 10:
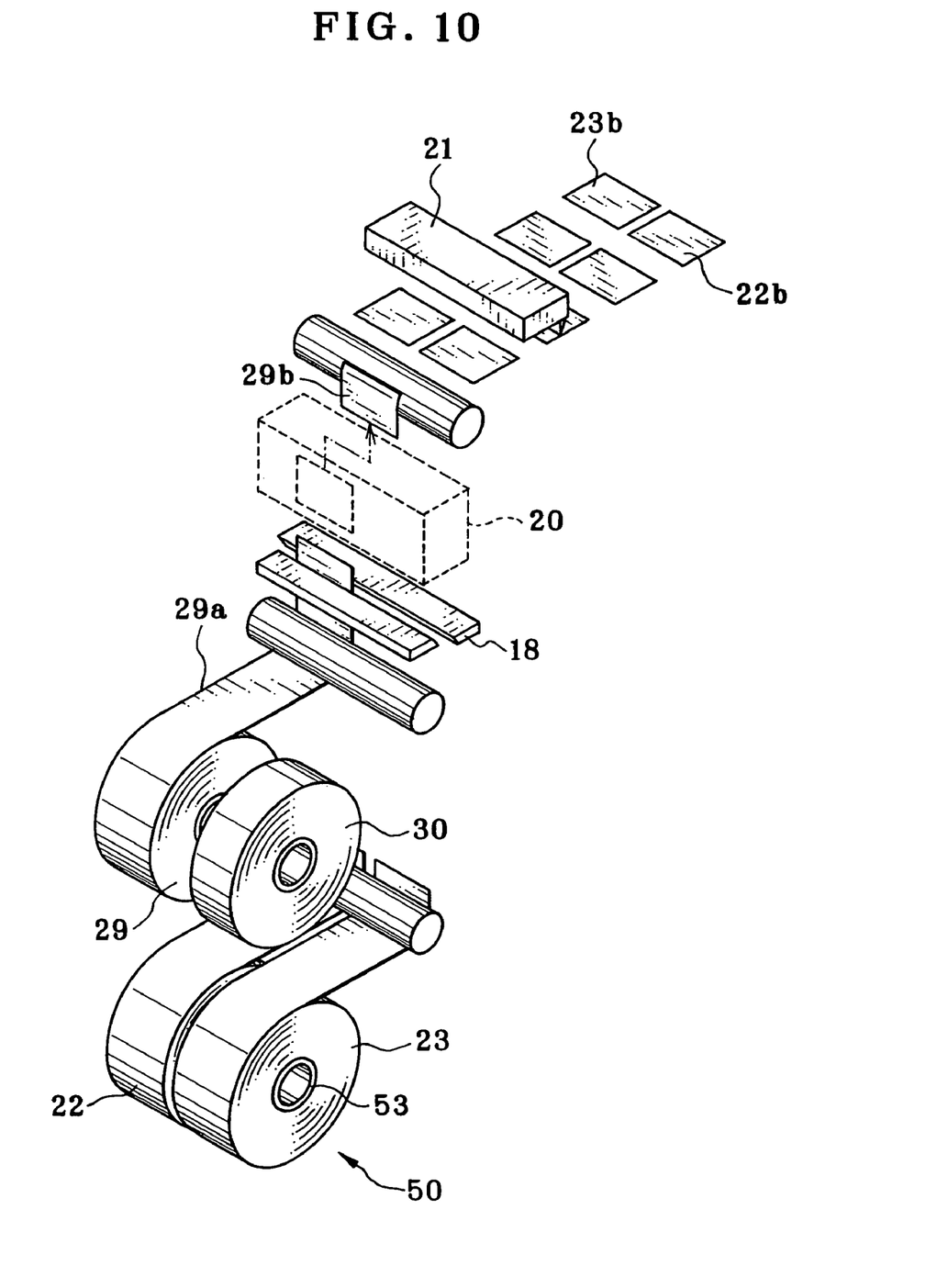
FIG. 10 is a perspective view illustrating printing to photographic paper sheets advanced from the single photographic paper roll.

In FIG. 10, another preferred embodiment is illustrated, in which a final image frame in the first frame printing sequence 70 is recorded suitably. A photographic paper sheet 29b as a recording sheet is supplied from the photographic paper roll 29 in the single roll magazine 15. It is possible to print the final image frame on the photographic paper sheet 29b. The shifting mechanism 20 shifts the photographic paper sheet 29b in the web width direction, to set the center of the photographic paper sheet 29b on the centerline CL of the image forming exposure printhead 21. See FIG. 5. Thus, skew travel of the photographic paper sheet 29b can be prevented.

It is conceivable that the first frame printing sequence 70 includes a panoramic size frame different from frames of the regularly used king size. For this case, the two trains of sheets supplied from the twin roll magazine 13 are used for the king-size frames. The photographic paper roll 30 from the single roll magazine 16 is used for printing of the panoramic size frame. It is preferable to use a shifting mechanism for shifting the photographic paper roll 30 from the single roll magazine 16 in the web width direction.

Figure 11:
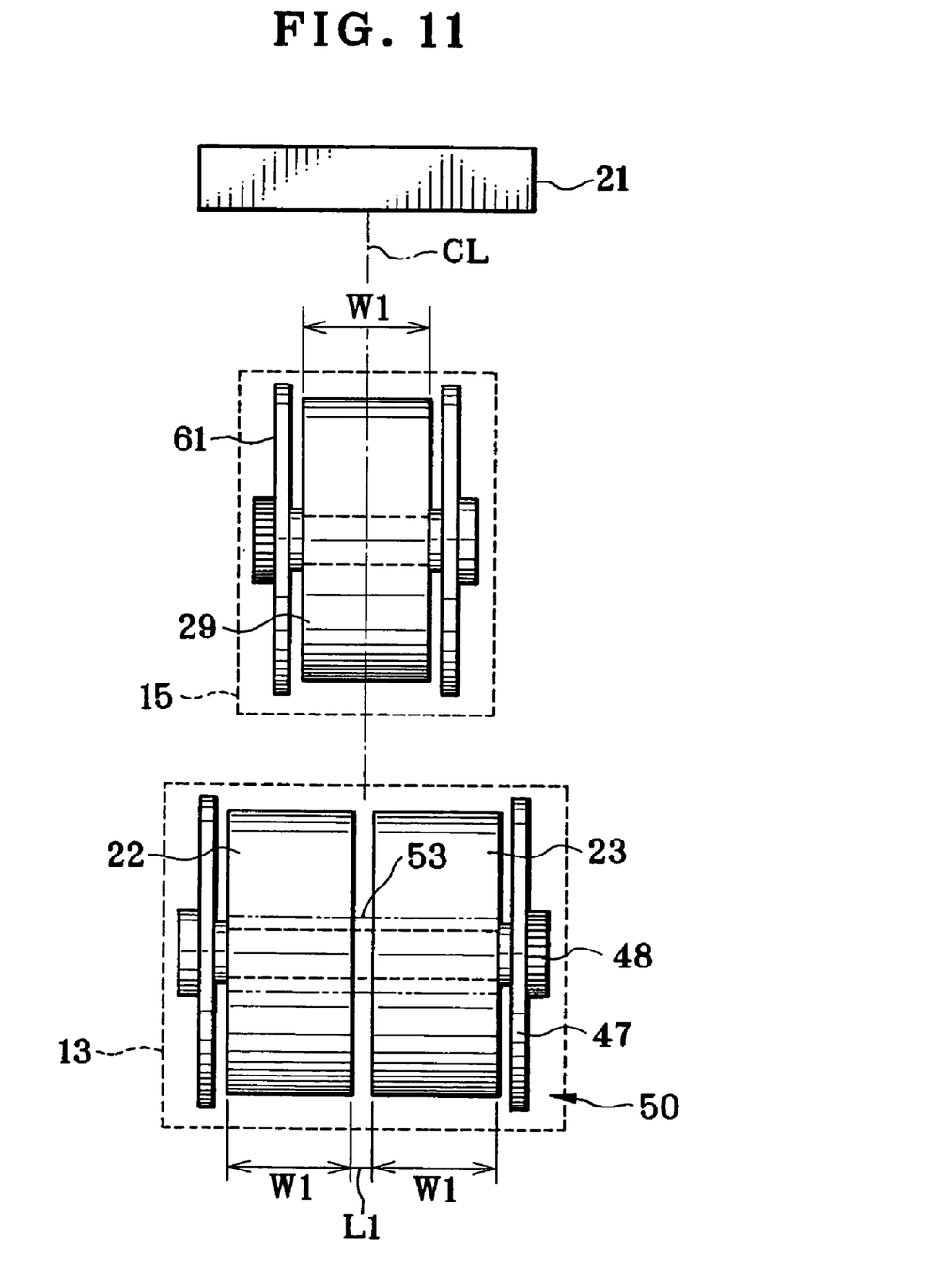
FIG. 11 is an explanatory view illustrating a relationship in the position between photographic paper rolls in the twin roll magazine and a single photographic paper roll.

In the above embodiment, the two single roll magazines are arranged with one another. However, in FIG. 11, only the one single roll magazine 15 may be loaded. In view of preventing a skew state, it is preferable to set the center of the photographic paper roll 29 in the single roll magazine 15 on the centerline CL of the image forming exposure printhead 21. Also, the photographic paper roll unit 50 may include three or more photographic paper rolls.

Figure 12:
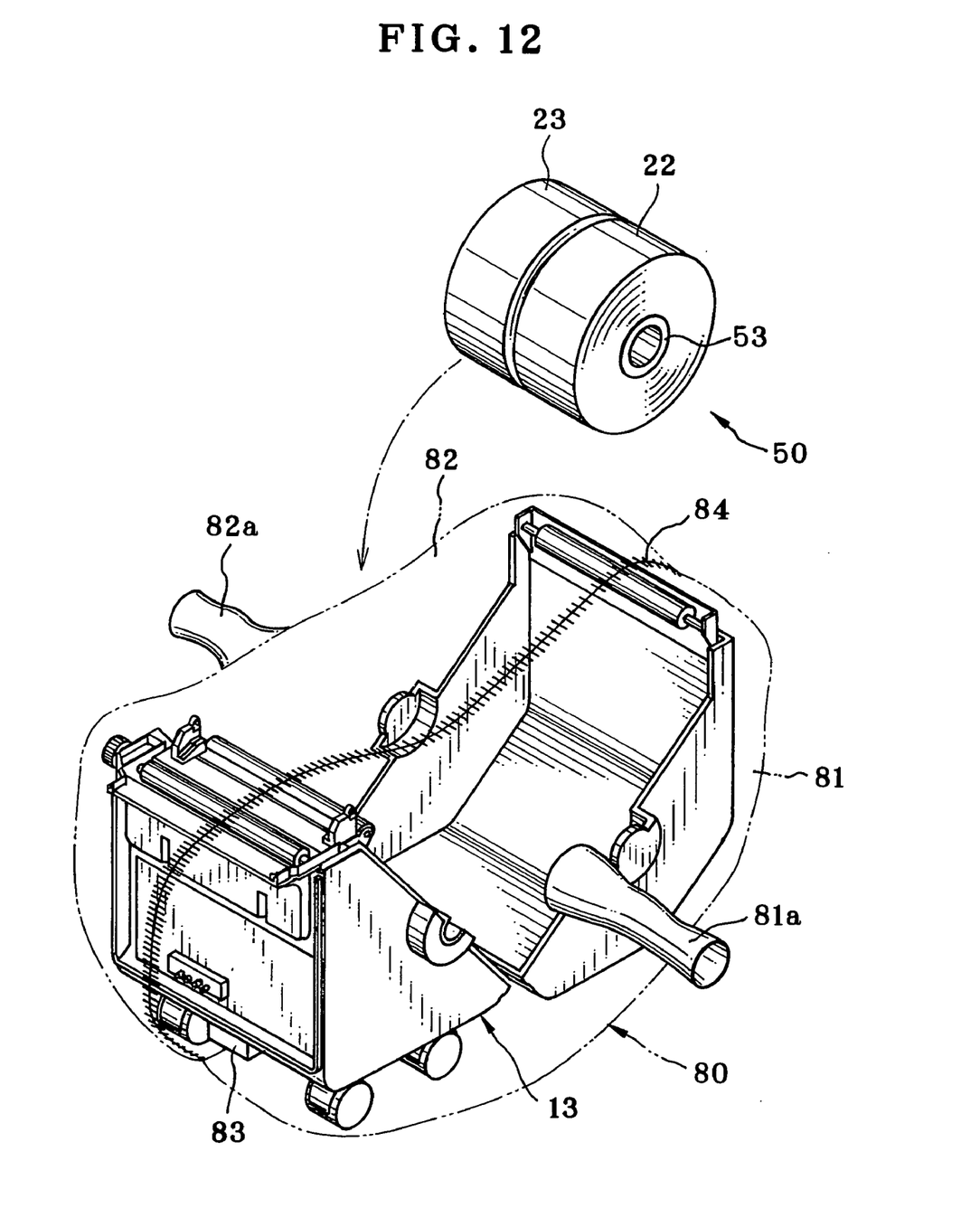
FIG. 12 is a perspective view illustrating a preferred embodiment in which a light-tight bag is used for loading.

In the above embodiment, the light-tight packaging sheet 51 is used to enable setting of the photographic paper roll unit 50 in an illuminated room. However, it is possible not to use the light-tight packaging sheet 51 for wrapping, and to load the printer with the photographic paper roll unit 50 in a dark room. Furthermore, it is possible to use a light-tight bag 80 inside which the twin roll magazine 13 can be loaded with photographic paper. In FIG. 12, the light-tight bag 80 is constituted by a pair of light-tight bag bodies 81 and 82 of cloth. Two tubular paths 81a and 82a are formed in the light-tight bag bodies 81 and 82. A bag holder 83 is formed with a lower portion of the twin roll magazine 13, and contains folded components of the light-tight bag bodies 81 and 82. An operator takes out the light-tight bag bodies 81 and 82 in the folded state from the bag holder 83, and unfolds those. A fastener or zipper 84 is utilized to connect the light-tight bag body 81 to the light-tight bag body 82, to keep the inside of the twin roll magazine 13 light-tight together with the photographic paper roll unit 50. Hands and arms of the operator are inserted through the tubular paths 81a and 82a, to load the twin roll magazine 13 with the photographic paper roll unit 50. Consequently, the loading operation can be made in the environment of the illuminated room.

In the above embodiment, the single roll magazine 16 is loaded with the photographic paper roll having a web width according to the panoramic print size. However, the single roll magazine 16 can be loaded with a photographic paper roll having a web width (102 mm) according to the king size (KG). The photographic paper may be cut each time that the photographic paper is advanced by 152 mm, so as to obtain prints of the king size. Furthermore, the single roll magazine 16 can be loaded with a photographic paper roll having a web width according to the L size (127×89 mm), or other sizes.

In the above embodiment, the producing lot in the factory from which the photographic paper rolls 22 and 23 in combination are obtained is the same between those. However, the photographic paper roll unit 50 may include the photographic paper rolls 22 and 23 having equally predetermined photographic characteristics.

Figure 13:
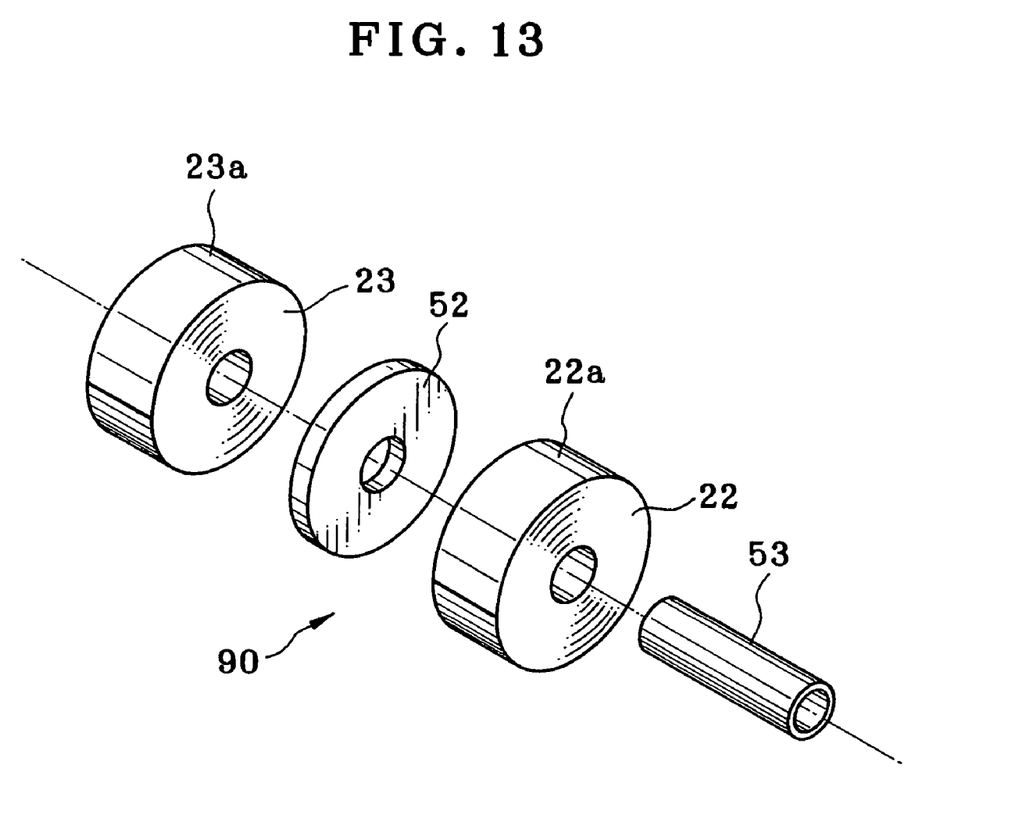
FIG. 13 is a perspective view illustrating another preferred photographic paper roll unit.

In FIG. 13, one preferred embodiment provides a photographic paper roll unit 90 as a recording material roll unit, which includes a spacer ring 52 disposed between the photographic paper rolls 22 and 23. A thickness of the spacer ring 52 can be adjusted for desired purposes. This can adjust the interval L1 in consideration of characteristics in the transport inside the photographic printer 11 and the paper processor 12.

According to the embodiments, the image recording apparatus is the photographic printer or printer-processor composite machine. However, an image recording apparatus of the invention may be a thermal printer, thermal transfer printer, inkjet printer, electrophotographic equipment, and the like for use with a roll of a long recording material for image forming. Furthermore, the recording material may be film, plate or thin material besides the photographic paper, and can be any suitable type of web material.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An image recording apparatus comprising:
a recording material loading unit, loaded with a recording material roll unit, for advancing plural web-shaped recording materials along a feeding path, wherein said recording material roll unit includes plural recording material rolls, constituted by said plural recording materials, disposed adjacent to one another in a web width direction of said recording materials, and associated in a manner rotatable with one another;
a cutter for cutting said plural recording materials at one time to obtain plural recording sheets; and
an image recording unit for recording an image frame on said recording sheets and at one time in said web width direction,
wherein said plural recording materials are wound on a common axial core and positioned away from each other at a predetermined interval,
wherein said recording material rolls comprise N recording material rolls; and said apparatus further comprising a control unit for determining whether a total number T of prints to be produced from image frames according to a first customer order is a multiple of N;
wherein if said total number T is not a multiple of N, then said image frames are sorted into a first group having N×A image frames and a second group having B image frame, where A and B satisfy a condition of T=N×A+B, A is an integer, and B is an integer smaller than N;
said first group is subjected to printing in a combined manner per N image frames;
said second group is subjected to printing in such a manner that an unused one of said recording sheets unused in printing for said second group is used for printing at least one of said image frames derived from said first group, and N recording sheets to be used at one time are provided with image frames from a single one of said first and succeeding customer orders.

2. An image recording apparatus as defined in claim 1, wherein said control unit further determines whether at least one specifically sized image frame is associated with said first customer order, said specifically sized image frame being designated for printing at a second printing size that is larger than said first printing size;
in printing of said specifically sized image frame on sheet printing at said second printing size, at least one selected image frame derived from said first customer order is printed on a remaining unused one of said recording sheets of said second printing size having been unused for said specifically sized image frame, wherein said selected image frame is further printed on one of said recording sheets of said first printing size.

3. An image recording apparatus comprising:
a recording material loading unit, loaded with a recording material roll unit, for advancing plural web-shaped recording materials along a feeding path, wherein said recording material roll unit includes plural recording material rolls, constituted by said plural recording materials, disposed adjacent to one another in a web width direction of said recording materials, and associated in a manner rotatable with one another;
a cutter for cutting said plural recording materials at one time to obtain plural recording sheets; and
an image recording unit for recording an image frame on said recording sheets and at one time in said web width direction,
wherein said plural recording materials are wound on a common axial core and positioned away from each other at a predetermined interval,
wherein said recording material rolls comprise N recording material rolls; and
said apparatus further comprising a control unit for determining whether a total number T of prints to be produced from image frames according to a first customer order is a multiple of N;
wherein if said total number T is not a multiple of N, then said image frames are sorted into a first group having N×A image frames and a second group having B image frame, where A and B satisfy a condition of T=N×A+B, A is an integer, and B is an integer smaller than N;
said first group is subjected to printing in a combined manner per N image frames;
said second group is subjected to printing in such a manner that an unused one of said recording sheets unused in printing for said second group is used for printing at least one image frame derived from a succeeding customer order, and N recording sheets to be used at one time are provided with image frames from said first and succeeding customer orders by printing.

4. An image recording apparatus as defined in claim 3, wherein said control unit flirt her determines whether at least one specifically sized image frame is associated with said first customer order, said specifically sized image frame being designated for printing at a second printing size that is larger than said first printing size;
in printing of said specifically sized image frame on sheet printing at said second printing size, at least one selected image frame derived from said succeeding customer order is printed on a remaining unused one of said recording sheets of said second printing size having been unused for said specifically sized image frame.

5. An image recording apparatus comprising:
a recording material loading unit, loaded with a recording material roll unit, for advancing plural web-shaped recording materials along a feeding path, wherein said recording material roll unit includes plural recording material rolls, constituted by said plural recording materials, disposed adjacent to one another in a web width direction of said recording materials, and associated in a manner rotatable with one another;
a cutter for cutting said plural recording materials at one time to obtain plural recording sheets; and
an image recording unit for recording an image frame on said recording sheets and at one time in said web width direction, wherein said plural recording materials are wound on a common axial core and positioned away from each other at a predetermined interval, wherein said recording material loading unit has a twin roll magazine including:

a magazine body for containing said recording material roll unit having said recording material rolls being two in a rotatable manner;

a magazine lid for closing said magazine body in an openable manner to keep said magazine body light-tight;

a supply roller set for nipping said recording materials being two and for advance thereof along said feeding path, and wherein said recording material loading unit further has:

at least one single roll magazine for containing one recording material roll; and a magazine selector for designating a selected one of said twin roll magazine and said single roll magazine, to cause advance of said web-shaped recording material in said selected one to said feeding path.

6. An image recording apparatus as defined in claim 5, further comprising a control unit for determining whether a total number T of prints to be produced from image frames according to a first customer order is a multiple of 2;

wherein if said total number T is not a multiple of 2, then said image frames are sorted into a first group having 2×A image frames and a second group having one image frame, where A and B satisfy a condition of T=2×A+1, and A is an integer;

said first group is subjected to printing by selecting said twin roll magazine, and said second group is subjected to printing by selecting said single roll magazine.

7. An image recording apparatus as defined in claim 6, wherein said control unit further determines whether at least one specifically sized image frame is associated with said first customer order, said specifically sized image frame being designated for printing at a second printing size that is larger than said first printing size;

said specifically sized image frame is printed by selecting said single roll magazine.

8. An image recording apparatus as defined in claim 7, wherein said single recording material roll has a web width equal to a web width of said recording material rolls of said twin roll magazine.

9. An image recording apparatus as defined in claim 7, wherein said at least one single roll magazine comprises plural single roll magazines arranged in said web width direction, for containing single recording material rolls having web widths different from one another.

10. An image recording apparatus as defined in claim 9, further comprising a shifting mechanism for shifting said single recording material after being cut said cutter in said web width direction, to set a centerline thereof at a center of said image recording unit with respect to said web width direction.

* * * * *